United States Patent [19]

Buding et al.

[11] Patent Number: 4,581,417

[45] Date of Patent: Apr. 8, 1986

[54] PRODUCTION OF HYDROGENATED NITRILE RUBBERS

[75] Inventors: Hartmuth Buding, Dormagen; Heinrich Königshofen, Bergisch Gladbach; Zsolt Szentivanyi; Joachim Thörmer, both of Leverkusen, all of Fed. Rep. of Germany

[73] Assignee: Bayer Aktiengesellschaft, Leverkusen, Fed. Rep. of Germany

[21] Appl. No.: 638,954

[22] Filed: Aug. 8, 1984

[30] Foreign Application Priority Data

Aug. 19, 1983 [DE] Fed. Rep. of Germany ....... 3329974

[51] Int. Cl.$^4$ .............................................. C08F 8/04
[52] U.S. Cl. ................... 525/338; 525/329.3; 525/339
[58] Field of Search ................ 525/338, 339

[56] References Cited

U.S. PATENT DOCUMENTS 3,700,637 10/1972 Finch, Jr. ............................. 525/338

FOREIGN PATENT DOCUMENTS 1558491 1/1980 United Kingdom.

Primary Examiner—Joseph L. Schofer
Assistant Examiner—Bernard Lipman
Attorney, Agent, or Firm—Connolly and Hutz

[57] ABSTRACT

The hydrogenation of NBR in an aromatic solvent with tris-(triphenylphosphane)-rhodium-(I) halide as catalyst under hydrogen pressures of from 20 to 350 bars and at temperatures in the range from 100° to 145° C. leads to products having degrees of hydrogenation of at least 90% and outstanding properties when the catalyst concentration amounts to between 0.05 and 0.6% by weight, based on solid rubber, and when hydrogenation is carried out in the presence of at most 2% by weight of triphenylphosphane.

8 Claims, No Drawings

PRODUCTION OF HYDROGENATED NITRILE RUBBERS

This invention relates to a process for the hydrogenation of nitrile rubbers, and subsequent working up of the hydrogenation product, at least 90% of the CC-double bonds being hydrogenated.

Nitrile rubbers obtained by the emulsion polymerization of (meth)acrylonitrile with conjugated dienes, for example butadiene, and, optionally, small amounts of other comonomers are known, for example, from German Pat. No. 658 172. In addition, it is known from U.S. Pat. No. 3,700,637 that nitrile rubbers of this type can be hydrogenated, the strength of the products thus obtained being improved by comparison with the non-hydrogenated starting products providing they are alternating acrylonitrile-butadiene copolymers.

According to DE-OS No. 25 39 132, the hydrogenation of statistical acrylonitrile-butadiene copolymers in solution also gives products having improved properties. In this case, the reaction is selective with respect to the degree of hydrogenation, depending on the solvent used.

In both cases, the catalyst used is a rhodium complex compound in combination with an excess of the complex ligand, preferably tris-(triphenylphosphane)-rhodium-(I) chloride together with triphenyl phosphane, broad limits being placed on the quantity of rhodium compound used, although effectively relatively large quantities, namely 1% by weight (DE-OS) and 2% by weight (US-PS), based on solid rubber, are used.

According to the DE-OS, the complex ligand, for example triphenyl phosphane, is used in a quantity of from 5 to 25% by weight, based on solid rubber. According to the US-PS, the ligand is used in a quantity of from 10 to 150 moles per mole of rhodium complex compound.

According to the prior art, the rhodium catalyst is recovered from the hydrogenation solutions on completion of hydrogenation, because the quantity in which it is effecively used would adversely affect the properties of the hydrogenated polymer and because recovery of the catalyst is advisable for economic reasons. Hydrogenation may be carried out over wide temperature and pressure ranges. According to DE-OS No. 25 39 132, it may be carried out at 50° to 150° C. under a hydrogen pressure of from 5 to 300 bars whilst, according to U.S. Pat. No. 3,700,637, it may be carried out at 100° C. under a hydrogen pressure of from 7 to 690 bars. However, hydrogenation is effectively carried out at 100° C. under a hydrogen pressure of from 60 to 70 bars.

Vulcanizates produced by peroxidic crosslinking from the products thus obtained do not show optimal properties if more than 90% of the double bonds are hydrogenated.

It has now surprisingly been found that vulcanizates showing outstanding properties can be obtained and that recovery of the rhodium catalyst is unnecessary providing the hydrogenation of statistical copolymers of conjugated dienes and (meth)acrylonitrile is carried out within selected temperature and pressure ranges using only small quantities of rhodium catalyst and at most 2% by weight of triphenyl phosphane.

Accordingly, the present invention relates to a process for the production of hydrogenated nitrile rubbers by hydrogenating statistical copolymers of from 85 to 52% by weight of a conjugated diene, from 15 to 48% by weight of (meth)acrylonitrile and from 0 to 10% by weight of other monomers copolymerizable with diene and (meth)acrylonitrile in solution in an aromatic solvent using tris-(triphenylphosphane)-rhodium-(I) halide as catalyst at temperatures of from 100° to 145° C. and under hydrogen pressures of from 20 to 350 bars, at least 90% of the CC-double bonds being hydrogenated, followed by working up, characterized in that at most 2% by weight of triphenyl phosphane and from 0.05 to 0.6% by weight of tris-(triphenylphosphane)-rhodium-(I) halide, based in each case on solid rubber, are added to the reaction mixture.

The hydrogenation mixture may be worked up by various methods. Preferably, the aromatic solvent is distilled off or removed by the injection of steam, followed by drying of the rubber. In addition, the rubber may be size-reduced by known methods.

Isoprene for example may be used as the conjugated diene, although butadiene is preferred, whilst methacrylonitrile for example may be used as the nitrile, although acrylonitrile is preferred.

A binary polymer of butadiene and acrylonitrile is preferred for hydrogenation.

It is preferred to add less than 1% by weight of triphenyl phosphane and, more particularly, no triphenyl phosphane at all. The rhodium complex compound is preferably used in a quantity of from 0.08 to 0.2% by weight.

The degree of hydrogenation preferably exceeds 95% and more preferably 99%. Chlorobenzene has proved to be a particularly suitable solvent. The hydrogen pressure is preferably of from 30 to 200 bars.

It has surprisingly been found that the Mooney viscosity, Mooney relaxation, Defo hardness and Defo elasticity values can be controlled through the quantity of rhodium catalyst added without any adverse effect upon other properties, particularly those of the vulcanizates.

Thus, fully hydrogenated products having Mooney viscosities of 70, 82 and 96 are obtained from an NBR containing 65.1% by weight of butadiene, remainder acrylonitrile, using for example 0.15% by weight, 0.3% by weight and 0.4% by weight, respectively, of rhodium catalyst under otherwise the same conditions.

The Mooney viscosity and Mooney relaxation values and also the Defo hardness and Defo elasticity values are measures of the processibility of elastomers (cf. P. S. Johnson in Kautschuk und Gummi, Kunststoffe 33, pages 725 et seq. (1980); R. Koopmann in Kautschuk und Gummi, Kunststoffe 36, page 108 et seg. (1983) and "Lexikon der Kautschuk-Technologie" by Schnetger (Verlag Dr. Hüther, 1981)).

Products having relatively low Mooney viscosity, Defo elasticity and Mooney relaxation values are more readily processed and, for example, may be mixed, extruded, injection-molded and formed better and more economically in terms of energy consumption.

Vulcanizates which, by virtue of their range of outstanding properties, are particularly suitable for high-quality sealing materials subjected to severe stressing, are obtained from the rubbers hydrogenated in accordance with the invention in the usual way by peroxidic crosslinking.

EXAMPLE 1

A solution of 3 kg of a statistical acrylonitrile-butadiene copolymer containing 34.9% by weight of acrylonitrile, ML 1+4/100° C.=29, in 27 kg of chlorobenzene having an oxygen content of <5 ppm and a solution of 4.5 g of tris-(triphenylphosphane)-rhodium-(I) chloride in 2 kg of chlorobenzene having an oxygen content of <5 ppm are introduced into a 40 liter autoclave blanketed with nitrogen (oxygen content <10 ppm by volume). The inert gas is replaced by hydrogen and hydrogenation is carried out for 5 hours at 120° C. under a hydrogen pressure of 190 bars. The chlorobenzene is removed by the injection of steam and the polymer is dried in vacuo. The degree of hydrogenation amounts to 99.7% (as determined by infrared spectroscopy).

Other polymers are similarly produced using different quantities of catalyst. Table 1 below shows (a) the Mooney viscosity values as determined in accordance with DIN 53 523 (ML 1+4), (b) the Mooney relaxation values MR (%), (c) the Defo hardness values $V_{10}$ (Ns) and (d) the Defo elasticity values (1/10 mm) in dependence upon the catalyst concentration in % by weight, based on solid rubber.

TABLE 1

| | Catalyst concentration | | | | | |
|---|---|---|---|---|---|---|
| | 0.15 | 0.3 | 0.4 | 0.6 | 0.8 | 1.0 |
| (a; 100° C.) | 70 | 82 | 96 | 122 | 140 | cannot be measured |
| (b) | 6.4 | 10 | 15.7 | 16.8 | 18.6 | cannot be measured |
| (c) | 170 | 236 | 283 | 340 | 435 | 524 |
| (d) | 31.8 | 37.4 | 40 | 42 | 45 | 51 |

EXAMPLE 2

Mixtures were produced from the products of Example 1 using the following formulation:
100.00 parts by weight of hydrogenated polymer
2.50 parts by weight of wax (Lunacera C 44 a product of L. W. Foller)
6.50 parts by weight of magnesium oxide (Maglite DE a product of Merck & Co)
3.50 parts by weight of zinc oxide (active zinc oxide manufactured by Bayer AG)
1.10 parts by weight of styrenized diphenylamine (Vulcanox DDA, a product of Bayer AG)
0.40 part by weight of the zinc salt of 2-mercaptobenzimidazole (Vulcanox ZMB 2, a product of Bayer AG)
50.00 parts by weight of carbon black N 774 (Durex O, a product of Degussa)
1.75 parts by weight of triallyl isocyanurate
7.00 parts by weight of 2,5-dimethyl-2,5-di-tert.-butylperoxyhexane (45% by weight of active compound)

Table 2 shows the values for mixture (I) and the vulcanizates (II) as determined in dependence upon the catalyst concentration. The vulcanization conditions are 18 minutes/180° C.; tempering for 17 hours/150° C.; "S2-Stab" (according to German Industrial Standard DIN 53504).

The determinations in this Example and in the following Example were carried out in accordance with German Industrial Standards DIN 53 504, 53 505, 53 517 method B and 53 512 F standing for tensile strength, D for breaking elongation, $M_{100}$ for modulus at 100% elongation, $H_{23}$ for Shore hardness A at 23° C., $E_{23}$ for resilience at 23° C. and CS for compression set.

TABLE 2

| | | Catalyst Concentration | | | | | |
|---|---|---|---|---|---|---|---|
| | | 0.15 | 0.3 | 0.4 | 0.6 | 0.8 | 1.0 |
| (I) | (a; 120° C.) | 84 | 94 | 104 | 110 | 119 | 132 |
| | (b) | 7.5 | 9.1 | 11.1 | 12.5 | 13.5 | cannot be measured |
| | (c) | 297 | 370 | 410 | 506 | 576 | 694 |
| | (d) | 21.7 | 28.8 | 30.4 | 33.6 | 34.1 | 43.0 |
| (II) | F (MPa) | 17.1 | 17.4 | 17.6 | 17.5 | 17.9 | 17.6 |
| | D (%) | 270 | 265 | 275 | 260 | 275 | 265 |
| | $M_{100}$ (MPa) | 7.4 | 7.9 | 7.8 | 7.9 | 8.1 | 7.7 |
| | $H_{23}$ | 77 | 77 | 76 | 78 | 77 | 78 |
| | $E_{23}$ (%) | 35 | 35 | 35 | 35 | 34 | 35 |

EXAMPLE 3

Using a catalyst concentration of 0.15% by weight, hydrogenation reactions were carried out as in Example 1 in the presence of different quantities of triphenylphosphane in % by weight, based on solid rubber. Table 3 below shows the Mooney viscosity of the mixture, which additionally contained 1 part by weight of stearic acid, and also the properties of the vulcanizates after vulcanization for 18 minutes at 180° C. and tempering for 17 hours at 150° C. ("S2-Stab"). The composition of the mixture corresponds to Example 2.

TABLE 3

| | Concentration of triphenylphosphane | | | | |
|---|---|---|---|---|---|
| | 0 | 0.5 | 1 | 2.5 | 5 |
| ML 1 + 4/120° C. | 75 | 76 | 75 | 74 | 71 |
| F (MPa) | 18.5 | 18.4 | 18.1 | 18.0 | 17.4 |
| D (%) | 300 | 315 | 340 | 390 | 470 |
| $M_{100}$ (MPa) | 8.4 | 8.1 | 7.7 | 6.7 | 5.4 |
| $M_{200}$ (MPa) | 15.6 | 14.9 | 14.2 | 13.1 | 11.1 |
| $M_{300}$ (MPa) | 18.5 | 18.0 | 17.3 | 16.1 | 14.1 |
| $H_{23}$ | 75 | 74 | 74 | 73 | 71 |
| $E_{23}$ (%) | 32 | 32 | 33 | 33 | 32 |
| CS 70h/23° C. (%) | 10.9 | 11.5 | 12.9 | 15.1 | 19.8 |
| CS 70h/125° C. (%) | 11.5 | 12.1 | 12.6 | 15.6 | 19.1 |
| CS 70h/150° C. (%) | 17.2 | 17.3 | 17.2 | 19.2 | 23.6 |

EXAMPLE 4

Further acrylonitrile-butadiene copolymers were hydrogenated in accordance with Example 1. The degrees of hydrogenation were all in excess of 99.5%.

Table 4 below shows the values obtained in dependence upon the acrylonitrile content of the copolymer (% by weight) and upon the quantity of rhodium catalysts used (% by weight, based on solid rubber).

TABLE 4

| Acrylonitrile content | 19 | 28 | 39 | | |
|---|---|---|---|---|---|
| Catalyst concentration | 0.5 | 0.5 | 0.15 | 0.25 | 0.5 |
| (a) | 134 | 115 | 96 | 124 | 138 |
| (c) | 34 | 28 | 26 | 29 | 36 |
| (d) | 52 | 45 | 41 | 43 | 47 |

EXAMPLE 5

Following the procedure of Example 1, 4.5 kg of polymer in 26.2 kg of chlorobenzene were hydrogenated with 7.1 g of tris-(triphenylphosphane)-rhodium-(I) bromide for 6 hours at 120° C./150 bars hydrogen. The degree of hydrogenation amounted to 99.7%.

EXAMPLE 6

Following the procedure of Example 1, 3.0 kg of polymer in 27 kg of chlorobenzene were hydrogenated with a solution of 4.5 g of catalyst and 3 g of triphenyl phosphane in 2 kg of chlorobenzene for 15 hours at 120° C./40 bars hydrogen. The degree of hydrogenation amounted to 99.6%.

We claim:

1. Process for the production of hydrogenated nitrile rubbers by hydrogenating statistical binary copolymers of from 85 to 52% by weight of butadiene and from 15 to 48% by weight of acrylonitrile in solution in an aromatic solvent and catalyzed with at most 2% by weight of triphenylphosphane and from 0.05 to 0.6% by weight of tris-(triphenylphosphane)-rhodium-(I) halide, based in each case on solid rubber, at temperatures of from 100° to 145° C. and under hydrogen pressures of from 20 to 350 bars, whereby at least 90% of the CC-double bonds are hydrogenated.

2. Process according to claim 1, wherein at most 1% by weight of triphenyl phosphane is added to the reaction mixture.

3. Process according to claim 1 comprising hydrogenating in the absence of triphenyl phosphane.

4. Process according to claim 1, wherein the degree of hydrogenation is above 95%.

5. Process according to claim 1, wherein the degree of hydrogenation is above 99%.

6. Process according to claim 1, wherein chlorobenzene is used as the solvent.

7. Process according to claim 1, wherein 0.08 to 0.2% by weight of the catalyst are added to the reaction mixture.

8. Process according to claim 1, wherein the pressure is from 30 to 200 bars.

* * * * *